US012371314B2

(12) United States Patent
Butterfield et al.

(10) Patent No.: US 12,371,314 B2
(45) Date of Patent: Jul. 29, 2025

(54) FLEXIBLE FUNNEL

(71) Applicant: Caliber, Inc., Burnsville, MN (US)

(72) Inventors: William D. Butterfield, Burnsville, MN (US); Kasey L. Pipo, Burnsville, MN (US); Ernest Delanghe, Burnsville, MN (US)

( * ) Notice: Subject to any disclaimer, the term of this patent is extended or adjusted under 35 U.S.C. 154(b) by 0 days.

(21) Appl. No.: 18/536,455

(22) Filed: Dec. 12, 2023

(65) Prior Publication Data

US 2024/0190690 A1 Jun. 13, 2024

Related U.S. Application Data

(60) Provisional application No. 63/431,892, filed on Dec. 12, 2022.

(51) Int. Cl.
*B67C 11/00* (2006.01)
*B67C 11/02* (2006.01)

(52) U.S. Cl.
CPC ........... *B67C 11/02* (2013.01); *B67C 2011/20* (2013.01)

(58) Field of Classification Search
CPC ........................................................ B67C 11/02
USPC .......................................................... 141/337
See application file for complete search history.

(56) References Cited

U.S. PATENT DOCUMENTS

| | | | | | |
|---|---|---|---|---|---|
| 5,056,932 | A * | 10/1991 | Young | A61J 19/00 383/44 |
| 11,401,149 | B1 * | 8/2022 | Bennett | B67C 11/04 |
| 2015/0053240 | A1 * | 2/2015 | Woodlock | B65D 11/1846 220/4.01 |
| 2022/0127127 | A1 * | 4/2022 | Campagnone | B67C 11/00 |

* cited by examiner

*Primary Examiner* — Timothy P. Kelly
(74) *Attorney, Agent, or Firm* — Whitestone Law, PLLC

(57) ABSTRACT

A foldable funnel includes a bowl having a continuous outer wall having a top edge defining an opening to an interior space. The continuous outer wall includes a plurality of spaced apart bowl living hinges and a first flange extending from the top edge, where the first flange having a width and a length. The foldable funnel includes a stem extending from the bowl, the stem having a through bore in fluid communication with the interior space wherein a cross-sectional area of the through bore is less than a cross-sectional area of the opening. The bowl is configured to be positioned into a first position wherein the bowl is configured to transfer a fluid from the bowl through the opening and the interior space and into the through bore in the stem. The bowl is also configured to be positioned into a second position wherein the bowl is folded about the plurality of living hinges into a compact configuration wherein the first flange having the length and the width is positioned over the opening of the bowl in the compact configuration to minimize the accumulation of dirt and grime in the bowl after use.

19 Claims, 7 Drawing Sheets

FLEXIBLE FUNNEL

BACKGROUND

The present disclosure relates to a funnel that is configured to add fluids to a port or reservoir, typically located in or on mechanical equipment. More particularly, the present disclosure relates to flexible funnel that is configured to be used to add fluids to a port or reservoir located in or on a vehicle or other mechanical equipment.

Many people work on equipment or vehicles and mechanical equipment to save money on maintenance and repairs. Typical maintenance on vehicles powered by internal combustion engines includes changing or adding fluids including motor oil, coolant fluid, transmission fluid, power steering fluid and/or brake fluid. Typically, funnels are used to add fluids to prevent the fluids from spilling onto the vehicle or equipment and causing undesirable effects. For instance, if motor oil is spilled onto an engine or exhaust manifold, the oil will burn off and cause smoke to be generated once the engine is at operating temperatures.

Typically, funnels are selected based upon the size of the bowl and the stem where the stem is sized to be inserted into the port of a part, such as an engine, a transmission and a radiator; or a reservoir, such as a power steering or brake fluid reservoir, to prevent or minimize spillage. Funnels are also useful because the port can be small and located in regions that are difficult to reach. Additionally, the funnel allows fluid to be poured from a container or jug with less accuracy relative to the location of the port and/or to compensate for uneven flow rates as the fluid is poured from the container or jug.

However, rigid funnels can be large and bulky, which can present issues when attempting to pour fluid into a port located in a confined space. In some instances, due to the location of the port and/or the configuration of the funnel, the stem of the funnel cannot be inserted into the port. Also, rigid funnels require storage or care after use to prevent dirt and grime from collecting on the surfaces that were contacted by the fluid As such, there is a need for a funnel that is flexible to adapt to confined spaces while being able to be stored in a compact configuration without the need for storage or care after use.

SUMMARY

An aspect of the present disclosure relates to a foldable funnel. The foldable funnel includes a bowl having a continuous outer wall having a top edge defining an opening to an interior space. The continuous outer wall includes a plurality of spaced apart bowl living hinges and a first flange extending from the top edge, where the first flange has a width and a length. The foldable funnel includes a stem extending from the bowl. The stem has a through bore in fluid communication with the interior space of the bowl, wherein a cross-sectional area of the through bore is less than a cross-sectional area of the opening. The bowl is configured to be positioned into a first position wherein the bowl is configured to transfer a fluid from the bowl through the opening and the interior space and into the through bore in the stem. The bowl is also configured to be positioned into a second position wherein the bowl is folded about the plurality of living hinges into a compact configuration wherein the first flange having the length and the width is positioned over the opening of the bowl in the compact configuration to minimize the accumulation of dirt and grime in the bowl after use.

Another aspect of the present disclosure relates to a foldable funnel having a bowl with a continuous outer wall having a top edge defining an opening to an interior space. The continuous outer wall includes at least four spaced apart bowl living hinges defining a front portion, a back portion, a right portion and a left portion. The bowl includes a first flange extending from the top edge proximate the back portion, the first flange having a width and a length. A stem extends from the bowl, where the stem has a through bore in fluid communication with the interior space and a cross-sectional area of the through bore is less than a cross-sectional area of the opening. The bowl is configured to be positioned in the first position wherein the bowl is configured to transfer a fluid from the bowl through the opening and the interior space and into the through bore in the stem. The bowl is also configured to be positioned into a second position wherein the left and right portions of the bowl are folded onto themselves such that the front and back portions are proximate each other by moving the portions of the bowl about the at least four spaced apart bowl living hinges into a compact configuration wherein the first flange having the length and the width is positioned over the opening of the bowl in the compact configuration to minimize the accumulation of dirt and grime in the bowl after use.

Another aspect of the present disclosure relates to a foldable funnel having a bowl with a continuous outer wall having a top edge defining an opening to an interior space. The continuous outer wall includes at least two spaced apart bowl living hinges defining a left front portion, a right front portion, a left back portion and a right back portion. A flange extends from the top edge proximate the left and right back portions, the flange having a width and a length. The funnel includes a stem extending from the bowl, where the stem has a through bore in fluid communication with the interior space and a cross-sectional area of the through bore is less than a cross-sectional area of the opening. The bowl is configured to be positioned in the first position wherein the bowl is configured to transfer a fluid from the bowl through the opening and the interior space and into the through bore in the stem. The bowl is also configured to be positioned into a second position wherein the left and right front portions are moved proximate the left and right back portions by flexing the bowl about the living bowl hinges to configure the funnel into a compact configuration wherein the flange having the length and the width is positioned over the opening of the bowl in the compact configuration to minimize the accumulation of dirt and grime in the bowl after use.

DETAILED DESCRIPTION

Figure 1:
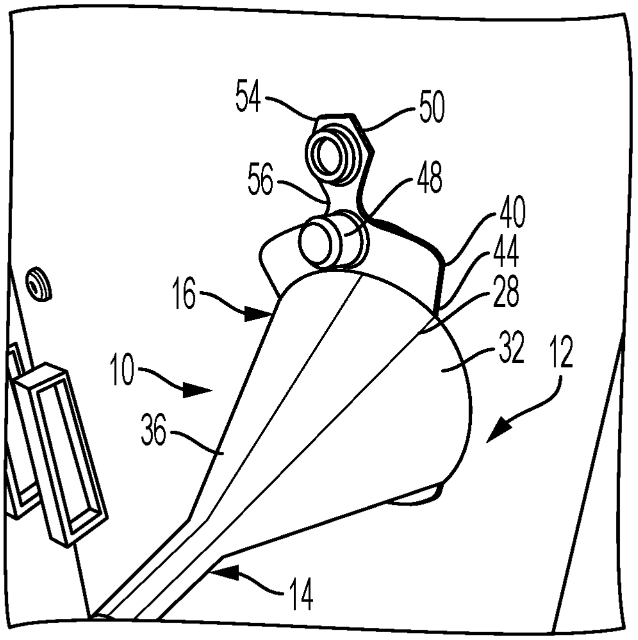
FIG. 1 is view of one embodiment of a foldable funnel in a first, fluid transferring position.
Figure 2:
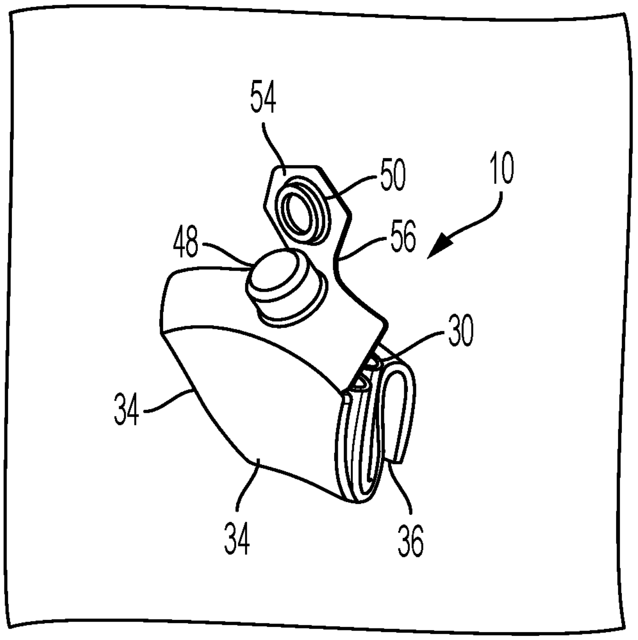
FIG. 2 is a view of the embodiment of the foldable funnel in a second, compact stored configuration.
Figure 4:
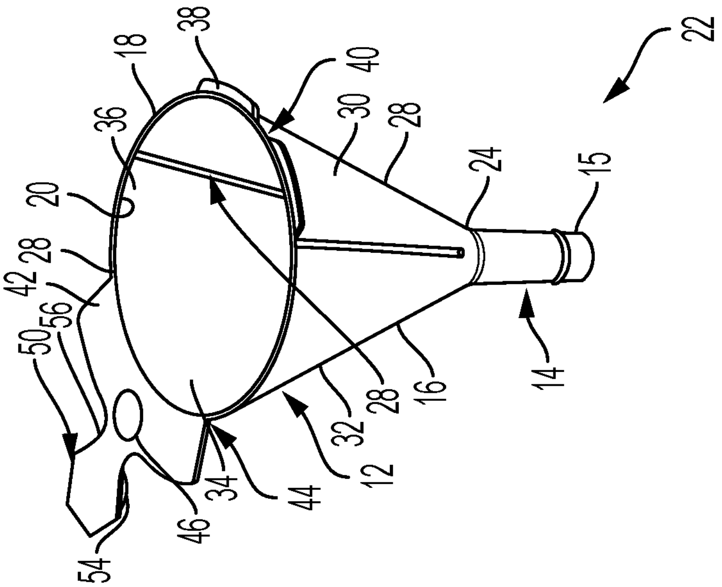
FIG. 4 is yet another view of the embodiment of the foldable funnel.
Figure 3:
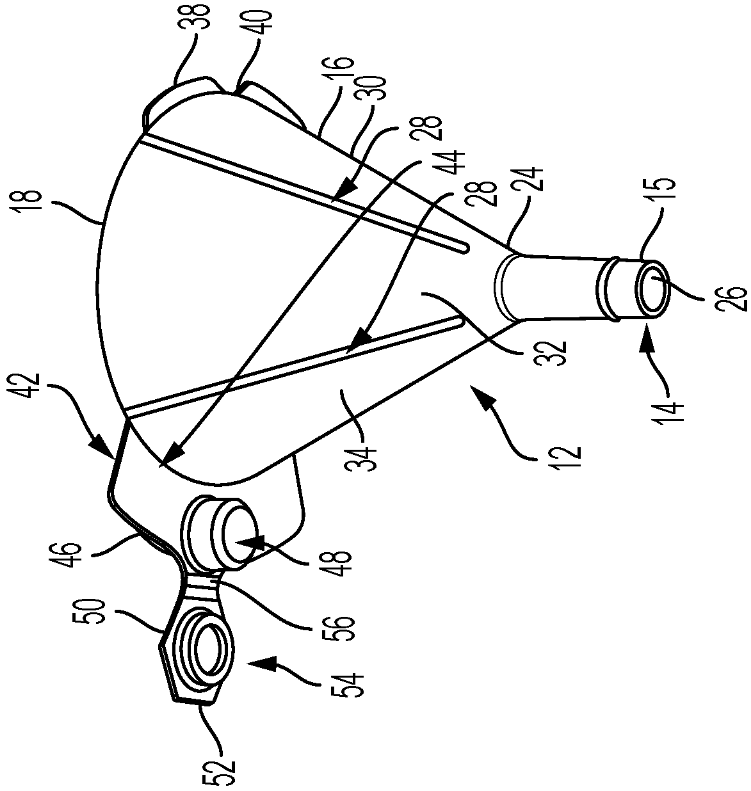
FIG. 3 is another view of the embodiment of the foldable funnel.

A flexible funnel is illustrated in FIG. 1 at 10. The flexible funnel 10 is of a unitary or monolithic construction that is typically molded polymeric material with living hinges. The polymeric material is sufficiently chemical resistant to withstand typical fluids used in internal combustion engines and/or associated systems within equipment or vehicles and has a durometer ranging from about 50 to about 80. The living hinges allow the funnel 10 to be configured in a first configuration where the funnel aids in the transfer of fluid, as illustrated in FIG. 1, and a second configuration where the funnel is folded into a compact, storing position, as illustrated in FIG. 2.

Referring to FIGS. 1-4, the funnel 10 includes a bowl 12 and a stem 14 extending from the bowl 12. The bowl 12 has a substantially frusto-conical continuous wall 16 that includes a top edge 18 that defines an opening 20 to an interior space 22. The stem 14 extends from a distal portion 24 of the bowl 12 where the stem 14 includes a through bore 26 in communication with the interior space 22 of the bowl 12. A cross-sectional area of the through bore 26 is less than a cross-sectional area of the opening 20. When in the first configuration, the funnel 10 is configured to cause fluid to flow through the opening 20, through the interior space 22 of the bowl 12 out of the through bore 26 of the stem 14 to transfer fluid from a storage container to a port.

The bowl portion 12 includes a plurality of substantially uniformly spaced living hinges 28 that define a front portion 30, a left portion 32, a back portion 34 and a right portion 36, wherein the front, left, back and right portions 30, 32, 34 and 36 have substantially a same size and configuration. The plurality of uniformly spaced living hinges 28 extend substantially vertically from proximate the top edge 18 to proximate the distal portion 24.

The funnel 10 includes a front flange 38 extending from the top edge 18 within the front portion 30. The front flange 38 includes a coped indent 40 that is configured to accept a portion of the stem 14 when the stem 14 is folded about a living hinge 42 located about the perimeter of the stem 14 proximate the distal portion 24.

The funnel 10 includes a back flange 42 that extends from the top edge 18 of the bowl 12 within the back portion 34. The back flange 42 is connected to the top edge 18 with a living hinge 44. The back flange 42 has width W from the living hinge 44 to a back surface 46 that is configured to be positioned over the opening 20 when the funnel 10 is in the second position. The back flange 42 includes a receptacle 48 therein that is configured to receive an end portion 15 of the stem 14.

The back flange 42 includes at tab 50 with a receptacle 52 that is configured to accept a magnet 54, where the magnet 54 can be used to store the funnel 10 by attaching to a ferrous metal surface. The tab 50 is connected to the back flange 42 with a living hinge 56 such that the tab 50 can move relative to the back flange 42.

To position the funnel 10 from the first, fluid transport position to the second, stored position, the left and right portions 32 and 36 are folded inwardly and the portions move about the plurality of living hinges 28 such that middle areas of the left and right portions 32 and 36 are proximate each other and the back portion 34 is proximate the front portion 30. With the front and back portions 30 and 34 proximate each other the stem 14 is moved toward the top edge 18 of the front portion 30 where the stem 14 proximate the end portion 15 is positioned within the coped indent 40.

With the stem 14 positioned within the coped indent 40, the back flange 42 is folded over the collapsed bowl 12 such that the back flange 42 covers the opening 20 in the top rim 18. The end portion 15 of the stem 14 is then positioned within the receptacle 48 such that the back flange 42 prevents dirt and grime from collecting in the interior surfaces of the bowl 12 and the stem 14 and retains the funnel 10 in the second, closed position. With the funnel 10 in the second, closed position, the tab 50 is positioned such that the magnet 54 is attracted to and connects to a metal surface above the ground level such that the funnel 10 is stored above ground level.

Figure 5:
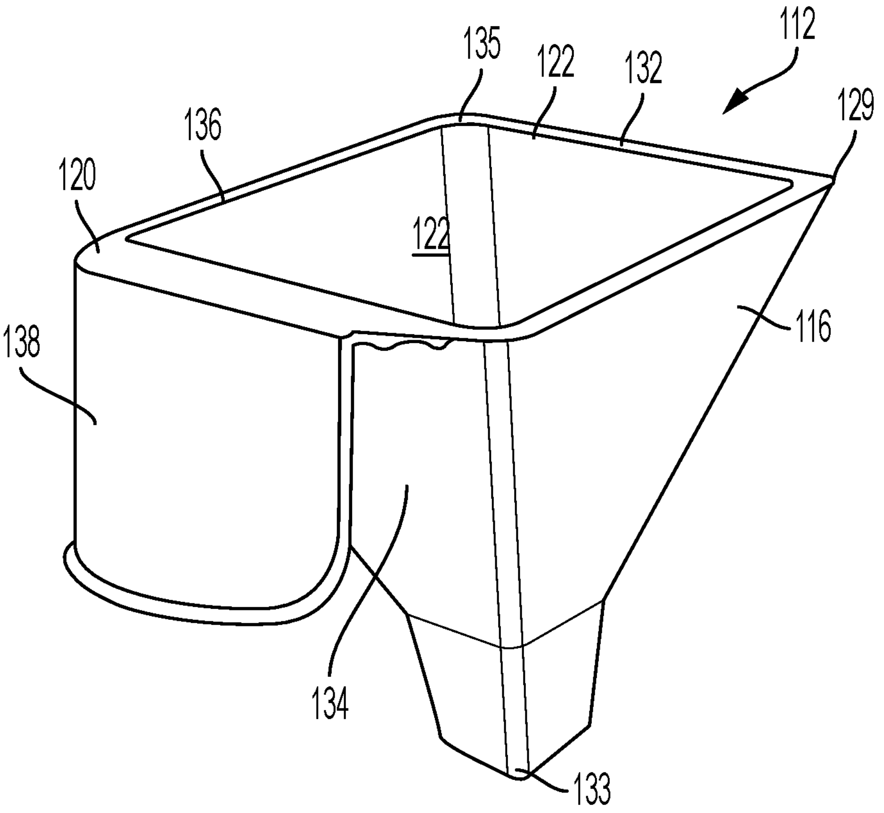
FIG. 5 is view of another embodiment of a foldable funnel in a first, fluid transferring position.
Figure 6:
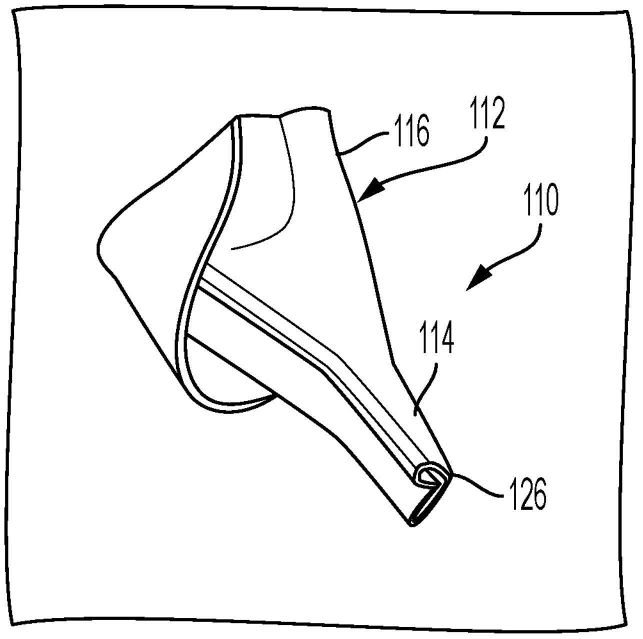
FIG. 6 is a view of the other embodiment of the foldable funnel in a second, compact stored configuration.
Figure 7:
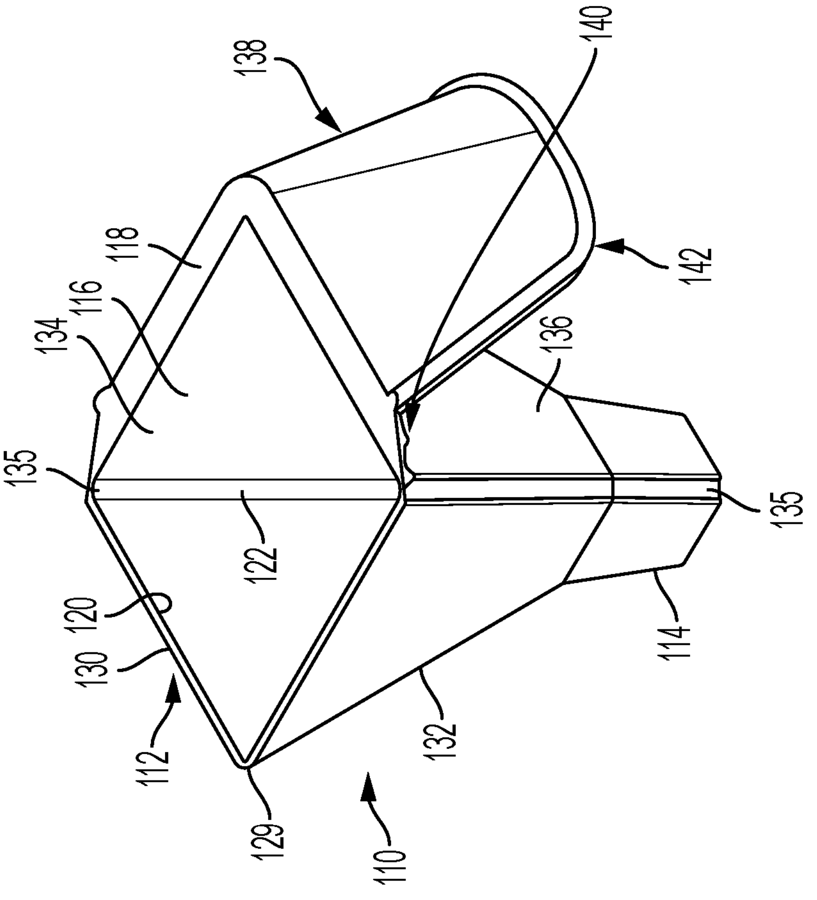
FIG. 7 is another view of the other embodiment of the foldable funnel.
Figure 8:
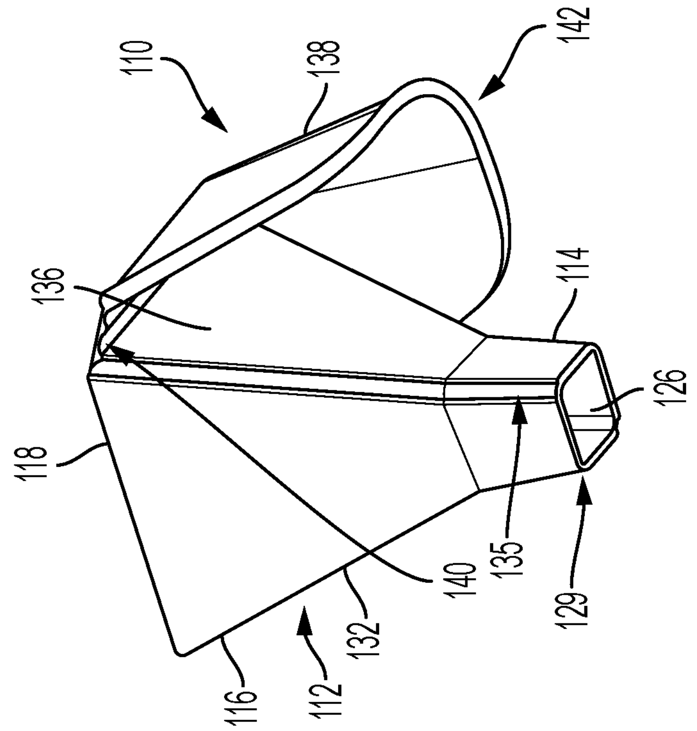
FIG. 8 is yet another view of the other embodiment of the foldable funnel.

Another funnel is illustrated at FIG. 5 at 110. The flexible funnel 110 is of a unitary or monolithic construction that is typically molded polymeric material with living hinges and is constructed of a polymeric material similar to that of the funnel 10. The living hinges allow the funnel 110 to be configured in a first configuration, as illustrated in FIG. 5, where the funnel aids in the transfer of fluid to a second configuration where the funnel is folded into a compact, storing position, as illustrated in FIG. 6.

Referring to FIGS. 5-9, the funnel 110 includes a bowl 112 and a stem 114 extending from the bowl 112. The bowl 112 has a substantially frusto-pyramid shaped continuous wall 116 that includes a top edge 118 that defines an opening 120 to an interior space 122. The stem 114 extends from a distal portion 124 of the bowl 112 where the stem 114 includes a through bore 126 in communication with the interior space 122 of the bowl 112. When in the first configuration, the funnel 110 is configured to cause fluid to flow into through the opening 120, through the interior space 122 of the bowl 112 and out of the through bore 126 of the stem 114 to transfer fluid from a storage container to a port.

The bowl portion 112 includes a front living hinge 129 that connects left and right front walls 130 and 132. A left living hinge 133 connect the left front wall 130 to a left back wall 134 and a right living hinge 135 connects the right front wall 132 to a back right wall 136. The bowl portion 112 includes a living hinge between the left back wall 134 and the right back wall 136.

The funnel 110 includes a flange 138 extending from the top edge 118 of the left and right back walls 134 and 136 wherein the flange 138 is connected to the left and right walls 134 and 136 with a living hinge 140. The flange 138 can be used as a handle for gripping and manipulating the funnel 110, as illustrated in FIG. 5, or as a cover when positioned in the second, stored positioned as illustrated in FIG. 6. The flange 138 includes a raised edge 142 around a perimeter to catch fluids flowing along the flange 138 to reduce spillage.

Figure 9:
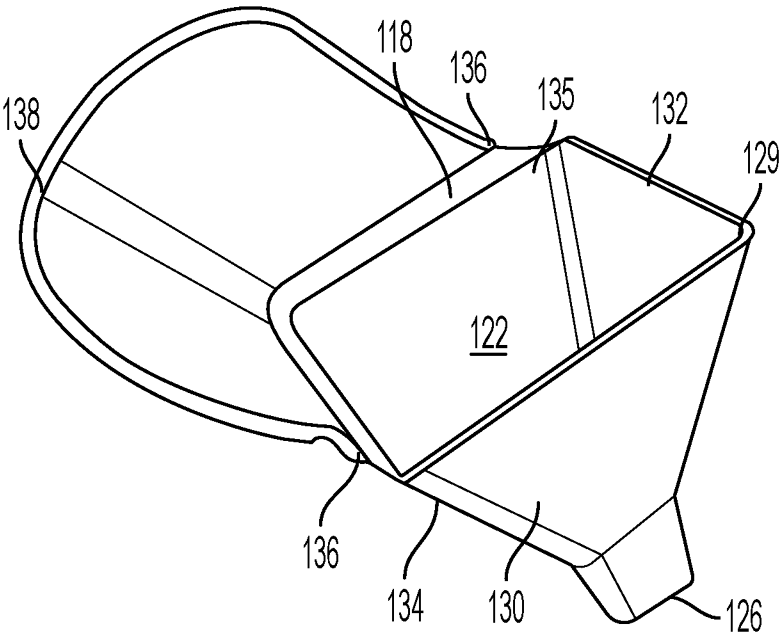
FIG. 9 is yet another view of the other embodiment of the foldable funnel.

The flange 138 can be positioned into an intermediate position as illustrated in FIG. 9, where the flange 138 extends above the top edge 118. The flange 138, in the intermediate position, extends the bowl 112 of the funnel 110 and acts as a catch for fluid that is being poured into the bowl 112 when the funnel 110 is being held at an angle.

To position the funnel 110 from the first, fluid transport position to the second, stored position, the left and right front walls 130 and 132 are folded inwardly about the front living hinge 129, the left living hinge 133 and the right living hinge 135 until the left front wall 130 is proximate the left back wall 134 and the right front wall 132 is proximate the right back wall 136. In the second, stored configuration, the front walls 130 and 132 and the back walls 134 and 136 form "V" shaped configurations that can be flexed to be a substantially flat stack. The flange 138 is then rotated about the living hinge 142 such the flange 138 is folded over the stacked walls 130, 132, 134 and 136 where the flange 138 prevent dirt and grime from accumulating on the walls contacted by fluids.

Figure 10:
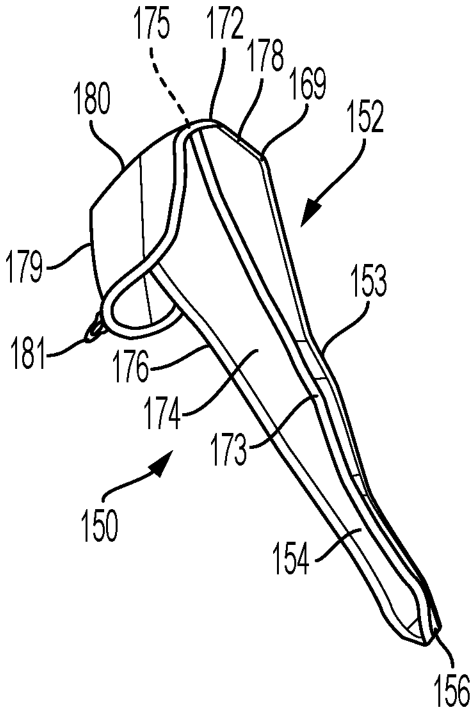
FIG. 10 is a view of a third embodiment of the foldable funnel in a first, fluid transferring position.
Figure 11:
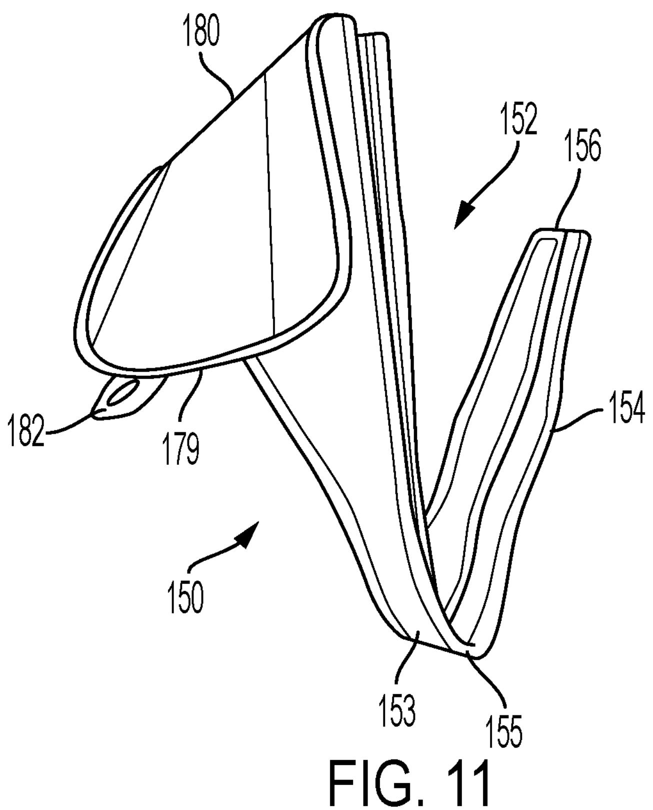
FIG. 11 is a view of the third embodiment of the foldable funnel in the process of being folded into the second, compact stored configuration.
Figure 12:
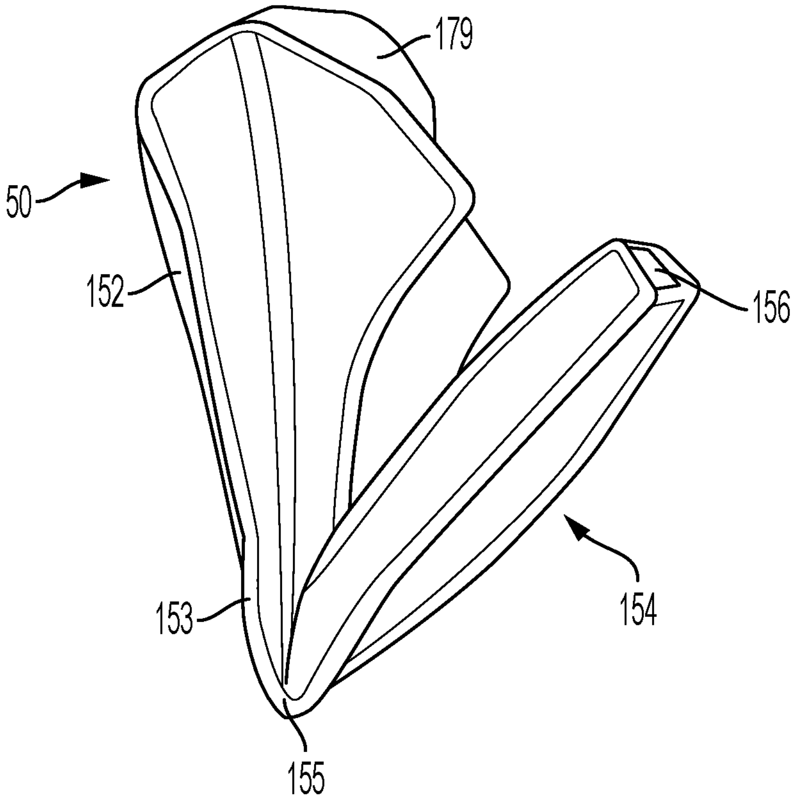
FIG. 12 is another view of the third embodiment of the foldable funnel in the process of being folded into the second, compact stored configuration.

Another funnel is illustrated at FIG. 10 at 150. The funnel 150 has a similar construction as the funnel 110. However, the funnel 150 includes a longer and narrower bowl 152 and stem 154 relative to the funnel 110.

The bowl 152 has a substantially frusto-pyramid shaped continuous wall 156 that includes a top edge 158 that defines an opening 160 to an interior space. The stem 154 extends from a distal portion 153 of the bowl 152 where the stem 154 includes a through bore 156 in communication with the interior space 162 of the bowl 122. When in the first configuration, the funnel 150 is configured to cause fluid to flow into through the opening 160, through the interior space 162 of the bowl 152 and out of the through bore 156 of the stem 154 to transfer fluid from a storage container to a port.

The bowl portion 152 includes a front living hinge 169 that connects left and right front walls 170 and 172. A left living hinge 173 connect the left front wall 170 to a left back wall 174 and a right living hinge 175 connects the right front wall 172 to a back right wall 176. The bowl portion 152 includes a living hinge between the left back wall 174 and the right back wall 176.

Figure 13:
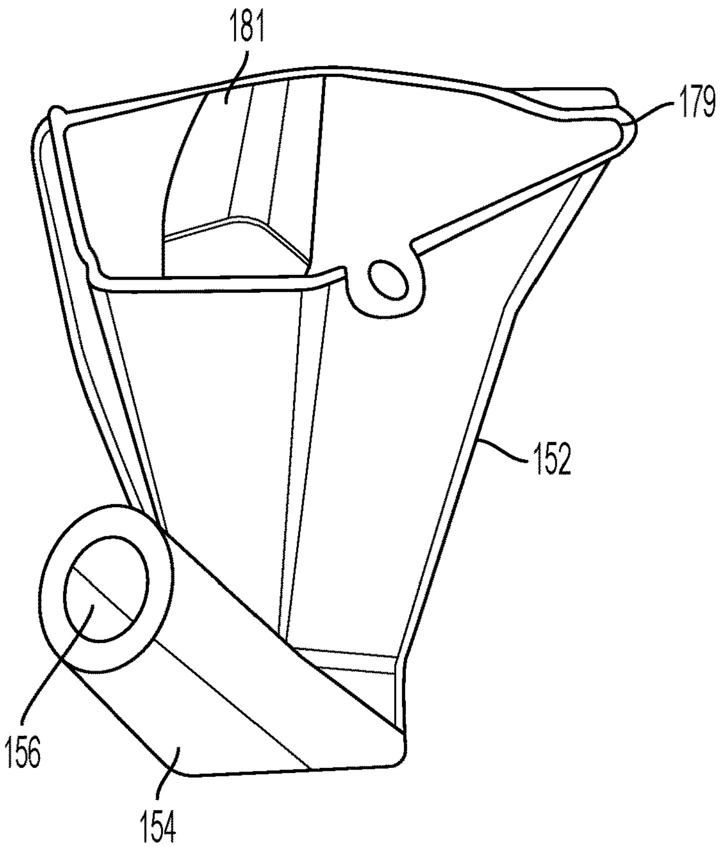
FIG. 13 is another view of the third embodiment of the foldable funnel in the process of being folded into the second, compact stored configuration.
Figure 14:
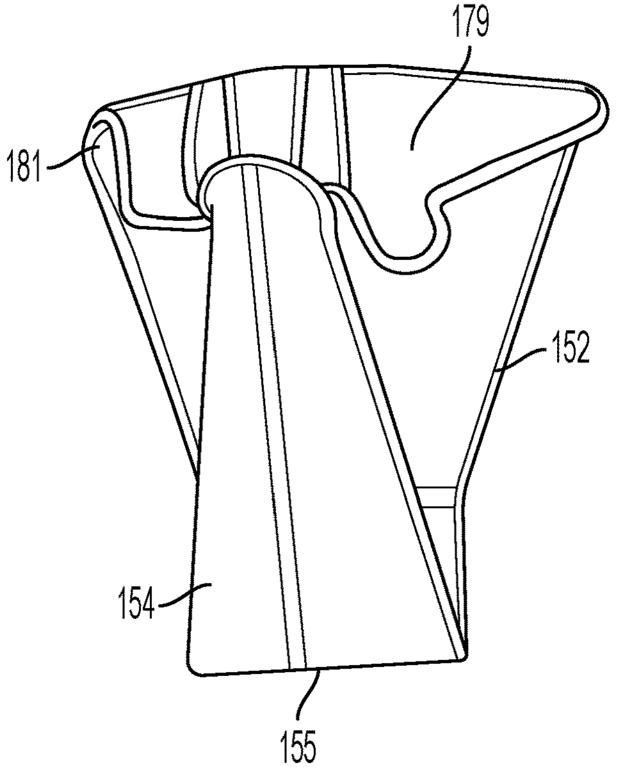
FIG. 14 is a view of the third embodiment of the foldable funnel in the second, compact stored configuration.

The funnel 150 includes a flange 179 extending from the top edge 178 of the left and right back walls 174 and 176 wherein the flange 179 is connected to the left and right walls 174 and 176 with a living hinge 180. The flange 179 can be used as a handle for gripping and manipulating the funnel 110, as illustrated in FIG. 10, or as a cover when positioned in the second, stored positioned as illustrated in FIGS. 13 and 14. The flange 179 can also be used in the intermediate position, as discussed above and illustrated in FIG. 9. The flange 179 includes a raised edge 182 around a perimeter to catch fluids flowing along the flange 179 to reduce spillage.

To position the funnel 150 from the first, fluid transport position to the second, stored position, the left and right front walls 170 and 172 are folded inwardly about the front living hinge 169, the left living hinge 173 and the right living hinge 175 until the left front wall 170 is proximate the left back wall 174 and the right front wall 172 is proximate the right back wall 176.

The stem 154 is rotated about a living hinge 155 between the stem 154 and the bowl 152 such that the opening of the through bore 156 is proximate the top edge 178 if the bowl 152. The flange 178 is then rotated about the living hinge 182 such the flange 178 is folded over the stacked walls 170, 172, 174 and 176 where the flange 179 includes a pocket 181 configured to accept the stem 154 and cover the opening 160, such that the flange 179 prevent dirt and grime from accumulating on the walls contacted by fluids.

Although the present invention has been described with reference to preferred embodiments, workers skilled in the art will recognize that changes may be made in form and detail without departing from the spirit and scope of the invention.

The invention claimed is:

1. A foldable funnel comprising:

a bowl comprising a continuous outer wall having a top edge defining an opening to an interior space, the continuous outer wall comprising a plurality of spaced apart bowl living hinges;

a first flange extending from the top edge, the first flange having a width and a length; and a stem extending from the bowl, the stem having a through bore in fluid communication with the interior space wherein a cross-sectional area of the through bore is less than a cross-sectional area of the opening;

wherein the bowl is configured to be positioned into a first position wherein the bowl is configured to transfer a fluid from the bowl through the opening and the interior space and into the through bore in the stem, and the bowl is configured to be positioned into a second position wherein the bowl is folded about the plurality of living hinges into a compact configuration wherein the first flange, having the length and the width, is positioned over the opening of the bowl in the compact configuration to minimize the accumulation of dirt and grime in the bowl after use;

wherein the plurality of spaced apart bowl living hinges extends from proximate the top edge of the bowl to proximate a juncture of the bowl and the stem.

2. The foldable funnel of claim 1, wherein the first flange includes a receptacle wherein when the bowl is in the second position, an end portion of the stem is configured to be positioned into the receptacle.

3. The foldable funnel of claim 2, wherein the stem is attached to the bowl with a bottom living hinge such that the end portion of the stem is movable to be positioned into and out of the receptacle.

4. The foldable funnel of claim 3 and further comprising a second flange extending from the top edge opposite the first flange, the second flange comprising a coped indent configured to accept a surface of the stem when the funnel is in the second position.

5. The foldable funnel of claim 1, wherein the first flange retains a magnet configured to retain the funnel to a ferrous material.

6. The foldable funnel of claim 1, wherein the first flange is connected to the bowl with a top living hinge.

7. The foldable funnel of claim 1, wherein the plurality of spaced apart bowl living hinges extends from proximate the top edge of the bowl to proximate a discharge end of the stem.

8. The foldable funnel of claim 1, wherein the plurality of living hinges comprises two or more substantially uniformly spaced apart bowl living hinges, wherein the two or more substantially uniformly spaced apart bowl living hinges define a left front portion, a right front portion, and/or a left back portion and a right back portion, wherein the left and right front portion are moved proximate the left and right back portions when the funnel is in the second position.

9. The foldable funnel of claim 1, wherein the bowl comprises a frusto-conical configuration.

10. The foldable funnel of claim 1, wherein the bowl comprises a frusto-pyramid configuration.

11. A foldable funnel comprising:

a bowl comprising a continuous outer wall having a top edge defining an opening to an interior space, the continuous outer wall including at least two spaced apart bowl living hinges defining a front portion, a back portion, and/or a right portion and a left portion;

a first flange extending from the top edge proximate the back portion, the first flange having a width and a length;

a stem extending from the bowl, the stem having a through bore in fluid communication with the interior space wherein a cross-sectional area of the through bore is less than a cross-sectional area of the opening;

wherein the bowl is configured to be positioned into a first position wherein the bowl is configured to transfer a fluid from the bowl through the opening and the interior space and into the through bore in the stem, and the bowl is configured to be positioned into a second position wherein the left and right portions of the bowl are folded onto themselves such that the front and back portions are proximate each other by moving the portions of the bowl about at least four spaced apart bowl living hinges into a compact configuration wherein the first flange having the length and the width is positioned over the opening of the bowl in the compact configuration to minimize the accumulation of dirt and grime in the bowl after use; and further comprising a second flange extending from the top edge proximate the front portion that is opposite the first flange, the second flange comprising a coped indent configured to accept a surface of the stem when the funnel is in the second position.

12. The foldable funnel of claim 11, wherein the first flange includes a receptacle wherein when the bowl is in the second position, an end portion of the stem is configured to be positioned into the receptacle.

13. The foldable funnel of claim 12, wherein the stem is attached to the bowl with a bottom living hinge such that the end portion of the stem is movable to be positioned into and out of the receptacle.

14. The foldable funnel of claim 11, wherein the first flange retains a magnet configured to retain the funnel to a ferrous material.

15. The foldable funnel of claim 11, wherein the first flange is connected to the bowl with a top living hinge.

16. A foldable funnel comprising:

a bowl comprising a continuous outer wall having a top edge defining an opening to an interior space, the continuous outer wall comprising at least four spaced apart bowl living hinges defining a left front portion, a right front portion, a left back portion and a right back portion;

a flange extending from the top edge proximate the left and right back portions, the flange having a width and a length; and a stem extending from the bowl, the stem having a through bore in fluid communication with the interior space wherein a cross-sectional area of the through bore is less than a cross-sectional area of the opening;

wherein the bowl is configured to be positioned into a first position wherein the bowl is configured to transfer a fluid from the bowl through the opening and the interior space and into the through bore in the stem, and the bowl is configured to be positioned into a second position wherein the left and right front portions are moved proximate the left and right back portions by flexing the bowl about the living bowl hinges to configure the funnel into a compact configuration wherein the flange having the length and the width is positioned over the opening of the bowl in the compact configuration to minimize the accumulation of dirt and grime in the bowl after use;

wherein at least two spaced apart bowl living hinges extend from proximate the top edge of the bowl to proximate a juncture of the bowl and the stem.

17. The foldable funnel of claim 16, wherein the flange retains a magnet configured to retain the funnel to a ferrous material.

18. The foldable funnel of claim 16, wherein the flange is connected to the bowl with a top living hinge.

19. The foldable funnel of claim 16, wherein at least two of the four spaced apart bowl living hinges extend from proximate the top edge of the bowl to proximate a discharge end of the stem.

* * * * *